Figure 1:
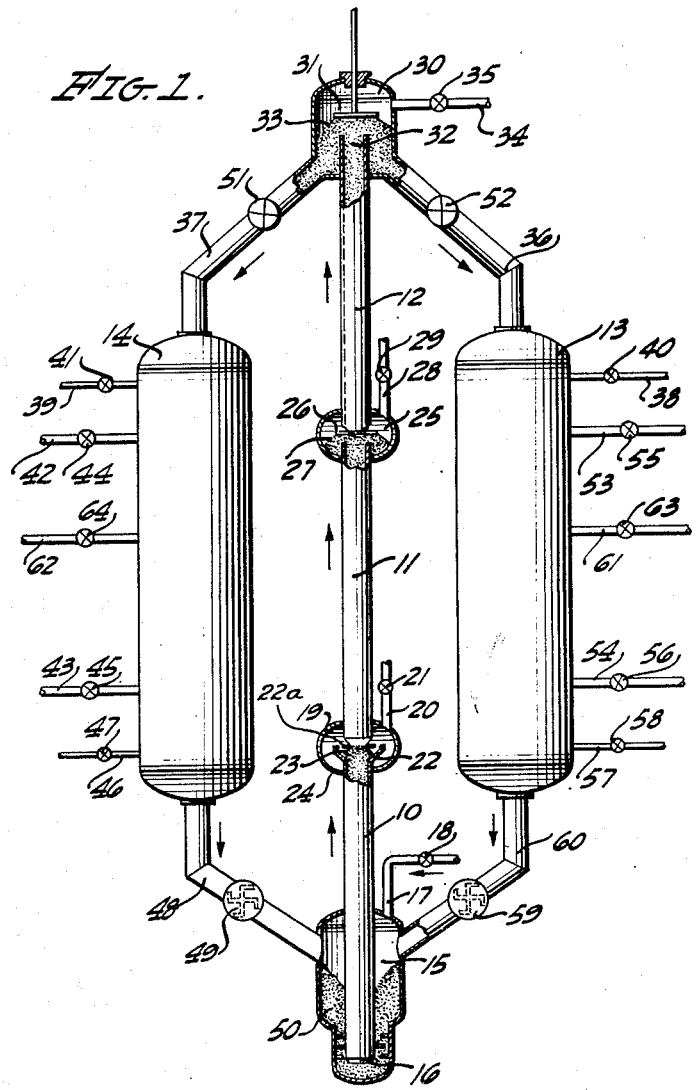

United States Patent Office 2,693,395
Patented Nov. 2, 1954

2,693,395

SOLIDS CONVEYANCE

Clyde H. O. Berg, Long Beach, Calif., assignor to Union Oil Company of California, Los Angeles, Calif., a corporation of California Application August 20, 1949, Serial No. 111,553

34 Claims. (Cl. 302—53)

This invention relates broadly to the conveyance of granular solids and particularly applies to those processes in which granular solids are transported from one point to another wherein it is desirable to maintain the degree of abrasion or attrition of the solids to an absolute minimum. Such processes are represented by the catalytic conversion processes in which chemical reactions of various kinds are effected in the presence of granular catalyst particles or in processes in which a gaseous mixture is separated by continuous contact with a granular adsorbent. This invention specifically relates to an improved method in which the solids are conveyed in substantially compact form through a conduit concurrently with a depressuring lift gas which comprises the lifting medium. This invention also relates to industrial processes in which the improved method of solids conveyance according to this invention is employed.

It is a primary object of the present invention to provide an improved method for the conveyance of granular solids in the presence of a transporting gas.

It is a further object of this invention to provide a method by means of which granular solids are conveyed at substantially their bulk density through a conduit concurrently with a depressuring lift gas wherein the formation of fines due to attrition or abrasion is materially reduced.

It is a further object of the present invention to provide an improvement in those processes employing a recirculating stream of granular solids by incorporating the improved method for solids conveyance of this invention.

Another object of this invention is to provide an improved apparatus for the conveyance of granular solids in which a uniform lift gas velocity is maintained by the removal of part of the depressuring lift gas at various points along the length of the path through which the solids are conveyed.

Other objects and advantages of this invention will become apparent to those skilled in the art as the description thereof proceeds.

Briefly, the present invention comprises an improvement in the conveyance of granular solids through a conduit in the presence of a concurrently flowing lift gas which is depressured along the direction of flow. It has been found that such granular solids can be transported substantially at their bulk density and in the form of a substantially compact solid plug through conduits under the influence of such a concurrently flowing and depressuring lift gas. Special methods of restriction are employed to introduce the solids into the inlet end of the conduit and to maintain the granular solids in substantially compact form during conveyance through the conduit as hereinafter more fully described.

This invention further comprises the combination of the above-described conveyance method with those industrial processes such as catalytic cracking, continuous selective adsorption and other processes in which compact masses of granular solids are continuously recirculated.

The primary advantage of the present invention for the conveyance of granular solids over those methods heretofore employed is the substantial reduction in the degree to which the granular solids are abraded with the formation of undesirable fine particles. In the circulation of cracking catalyst with bucket elevators, for example, difficulties are encountered with maintaining the moving parts at the elevated temperatures characteristic of the process as well as with considerable loss of catalyst due to attrition taking place in the elevator particularly at the bottom where the buckets are filled. In those systems where granular solids are conveyed in the form of suspensions, which may be dilute or concentrated suspensions, considerable attrition of the particles is encountered which is primarily due to the impact of one particle against the others and the impact of the individual particles against the walls and other surfaces of the conveying apparatus. In the present invention these disadvantages have been eliminated by transporting the granular solids at a bulk density which is substantially equal to the bulk density of the solids when they are at rest. The lineal velocity of the solid particles in the conveyor is relatively low and the particles are not free to impact one another. The attrition of solids transported according to the present invention is materially reduced from that encountered in the elevator or suspension type conveyors.

It has been found that in order to maintain smooth continuous operation of the conveyance method and apparatus of this invention, the lifting or conveying force of the depressuring lift gas must be applied to the individual particles of the transported solids at a uniform rate throughout the length of the lift line. Since the lift gas depressures as it moves concurrently with the solids through the lift line the volume per unit weight of lift gas increases thereby causing the lift gas velocity to increase proportionately with the pressure drop along the length of the conduit when the conduit has a uniform cross sectional area from one end to the other. In such a lift line undesirable effects are caused by the lift gas velocity increasing with the distance the granular solids have been conveyed and a higher lifting effect on the solids is obtained at the upper parts of the conduit causing voids to form and the solids stream becomes discontinuous. This is fundamentally due to the fact that the capacity of the conduit for solids flow is higher in these upper parts than at the bottom.

The flow rate of granular solids is given by:

$$Q = 1.41 \sqrt{\frac{dp}{dl\,\rho} - g} \, A^{1.5}$$

wherein Q is volumes of solids per unit time, $\rho$ is the bulk density of the solids, A is the conduit cross sectional area, and $$\frac{dp}{dl}$$

is the pressure drop per unit length. The term $$\sqrt{\frac{dp}{dl\,\rho} - g} \, A^{1.5}$$

may be termed the "solids flow criterion" and if maintained at a constant value by consideration of the variation of $$\frac{dp}{dl}$$

and A in the line, uniform continuous phase solids flow may be maintained. Such a constancy may be maintained by varying the cross sectional area A and maintaining a constant (with position not time) value of $$\frac{dp}{dl}$$

or by maintaining a constant value of A as in a cylindrical conduit and controlling the value of $$\frac{dp}{dl}$$

at a constant by removing portions of the lift gas at spaced points along the conduit. In such a cylindrical line the value of $$\frac{dp}{dl}$$

as well as the lift gas velocity are maintained at constant values.

In accordance with the principles of the present invention a certain quantity of the lift gas is removed at predetermined points along the length of the conduit in sufficient quantity to maintain the solids flow criterion at a uniform figure. The number of locations at which such a withdrawal of lift gas is carried out is dependent upon the magnitude of the pressure drop with respect to the absolute pressure of the system. For example, in a system in which a pressure of 500 pounds per square inch absolute is maintained and a pressure differential of 50 pounds per square inch exists across the conduit, a lift gas velocity increase of only about 10% would be anticipated and consequently the number of points at which a lift gas removal from the lift line would be required is substantially less than the number of points required should the absolute pressure of the assumed system be 100 pounds per square inch absolute. In the latter case the lift gas velocity increase of almost 100% would be expected.

In the conveyance systems of the present invention it is desirable to limit the maximum lift gas velocity in the lift line to a value of below 25% greater than the minimum lift gas velocity and preferably to maintain it to a value of less than 10% above the minimum lift gas velocity. The lift gas velocity existing above the restriction after introduction into the lift line may be considered the minimum velocity. Preferably the lift gas is not allowed to depressure sufficiently to increase the solids flow criterion at subsequent points along the line more than 10% and always less than 25%. When the value of $$\sqrt{\frac{dp}{dl\rho} - gA^{1.5}}$$

has increased by this amount, part of the lift gas is removed at that point to lower it to a value equal or near the minimum value referred to above. The gas thus removed at this and subsequent points may be compressed and returned to the lower end of the lift line.

The determination of the size of line needed to convey a known quantity of solids in a given time, the pressure drop required to convey it at that rate, the points along the lift line at which lift gas is required to be removed, and the quantity of lift gas removed at these points may be determined from the consideration of the basic mathematical expressions developed during the development of this conveyance method and apparatus.

The mathematical expression relating to the variables of operation and design of the conveyance apparatus of this invention is given below where the lift gas flows in a viscous or streamline type of flow, and in which the solids flow criterion of the lift time is constant:

$$\frac{A_x}{3}\left(\frac{A_x}{A_0}\right)^3 + A_x = \frac{aQ}{bg\rho^2}\left(\frac{P_0 - P_x}{P_x}\right) + 1.33 A_0\left(\frac{P_0}{P_x}\right) \quad (1)$$

where $A_0$ is the cross sectional area of the lift line at the bottom in square feet, $A_x$ is the cross sectional area of the lift line in square feet at any point $x$ feet from the bottom, $Q$ is the flow rate of granular solids through the lift line in pounds per second, $a$ is the fraction of voids in the granular solids, expressed as a fraction of 1, $P_0$ is the lift gas pressure at the bottom of lift line in pounds per square inch absolute, $P_x$ is the pressure of the lift gas in the lift line in pounds per square inch absolute at any point $x$ feet from the bottom, $g$ is the gravitational constant and equal to 32.2 feet per second, $\rho$ is the bulk density of the granular solids in pounds per cubic foot and $b$ is an experimentally determined constant characteristic of the granular solids and expressing the permeability of the compact granules with respect to lift gas flow. Constant $b$ is expressed by the following:

$$b = \frac{V}{A\left(\frac{dp}{dl}\right)} \quad (2)$$

where V is the gas volume, A is the cross sectional area, and $$\frac{dp}{dl}$$

is the differential pressure per differential length. This is a mathematical expression of Darcy's law for the flow of fluids through permeable solids. Constant $b$ is determined by the measurement of a pressure drop resulting from the flow of V volumes of gas through a mass of solids having a cross sectional area A. For example, in a granular coconut charcoal having a mesh size of about 12 to 30 and a bulk density of about 32 pounds per cubic foot, the value of $$\frac{dp}{dl}$$

is given by the following for a lift gas flowing in viscous flow:

$$\frac{dp}{dl} = 6840 \frac{V\mu}{A}$$

and $$b = \frac{1.46 \times 10^{-4}}{\mu} \quad (3)$$

It has further been determined that from energy consummation and solids attrition rate standpoint, the flow rate of granular solids through the lift line having a viscous flow of lift gas is preferably between 45% and 70% of the rate at which granular solids will flow by gravity freely through a vertical conduit of the same cross sectional area. The optimum solids flow rate is about 57% of the free flow rate. The free gravity flow of granular solids through a substantially vertical conduit is given by:

$$Q = 0.0034 \rho D^3 \quad (4)$$

where Q is the rate of free gravity flow in pounds per second, $\rho$ is the bulk density of the solids when compact in pounds per cubic foot and D is the conduit diameter in inches. The preferred flow rate of solids with a viscous flow lift gas is given by:

$$Q = 0.00196 \rho D^3 \pm 20\% \quad (5)$$

In the design of the lift line of the present invention the quantity of solids to be transported is usually known and the optimum cross sectional area at the bottom of the lift line $A_0$ may be determined from:

$$A_0 = \frac{\pi}{4}\left(\frac{Q}{0.00196 \rho}\right)^{2/3} \quad (6)$$

When the characteristics of the solids to be transported are known and the rate at which the solids are to be conveyed, all of the variables present in the fundamental Equation 1 are known with the exception of $A_x$ and $P_x$ for usually the pressure at the bottom of the lift line is known including the distance which the solids are to be transported.

The solution of the design equation is then a trial and error process. An estimation of the pressure drop across the entire lift line may be made by estimating the pressure drop necessary to counteract the gravitational force acting upon the entire column of solids. Such a pressure drop is given by:

$$\Delta P = L \frac{\rho}{144} \quad (7)$$

where L is the length of the lift line, and $\rho$ is the bulk density of the solids in consistent units. A second estimation of the pressure differential necessary to actually move the solid plug of granules against gravity and friction is then made by assuming a value of $\Delta P$ according to Equation 7 which is between 1% and about 25% greater than the value of $\Delta P$ according to Equation 7. This value of pressure differential is subtracted from $P_0$ to obtain a preliminary value of $P_x$ for the top lift line pressure.

The fundamental design Equation 1 is then solved at arbitrary values of $P_x$ varying between the estimated $P_x$ and the known $P_0$ to find corresponding values of $A_x$. A graphical plot of $A_x$ as the ordinate against $P_x$ as the abscissa is then made thereby establishing an estimated relation between the cross sectional area of the lift line at any point with the lift gas pressure at that point. The curve thus obtained is substantially linear when the pressure drop across the lift line is a small fraction of the absolute pressure of the system or a small fraction of $P_0$.

During this development there was also established a second fundamental design relationship which expressed the relationship between the differential lift gas pressure per differential length of lift line $$\frac{dp}{dl}$$

to the bulk density of granular solids and the ratio of cross sectional area at the bottom of the lift line to the cross sectional area of the lift line at any point $x$. This equation is given as follows for viscous lift gas flow:

$$\frac{dp}{dl} = \rho\left[1 + 0.33\left(\frac{A_0}{A_x}\right)^3\right] \quad (8)$$

There are two manners of proceeding from Equation 8, one being by solving for $\int dl$ which will be considered here and the other by solving for $\int dp$. According to the first method, by rearranging Equation 8 an expression for the length of the lift line may be obtained as follows:

$$L = \frac{1}{\rho}\int_{P_0}^{P_x} \frac{dp}{\left[1 + 0.33\left(\frac{A_0}{A_x}\right)^3\right]} \quad (9)$$

The integration of Equation 9 between the limits of $P_0$ and estimated $P_x$ at the top of the lift line will give a value of $L$ the length of the lift line which, if the estimated lift line pressure drop were correct, will agree with the known value of $L$, the distance over which the solids are to be transported. To determine this value of $L$, let:

$$F_1 = \rho\left[1 + 0.33\left(\frac{A_0}{A_x}\right)^3\right] \quad (10)$$

The relationship between $P_x$ and $A_x$ is known, $A_0$ and $\rho$ are known and for arbitrary values of $P$ between the limits of $P_x$ and $P_0$ the values of the factor $F_1$ are determined. A second plot is then made showing values of factor $F_1$ as a function of the arbitrarily chosen values of $P_x$. By graphical integration of this curve the average value of $F_1$ may be determined, which when multiplied by $\Delta P$ or the difference between $P_0$ and $P_x$ will give a value for $L$ which is the length of the lift line. Comparison of this calculated value of $L$ with the known distance of $L$ over which the solids are to be transported indicates by the agreement that the correct pressure differential across the lift line was assumed in the first estimation. If the calculated value of $L$ is greater than the known value of $L$, the assumed pressure differential ($P_0 - P_x$) was too high and a smaller differential pressure must be estimated from Equation 7 and recalculation made until agreement between the calculated value of $L$ and the known value of $L$ is obtained.

Figures 2, 3:
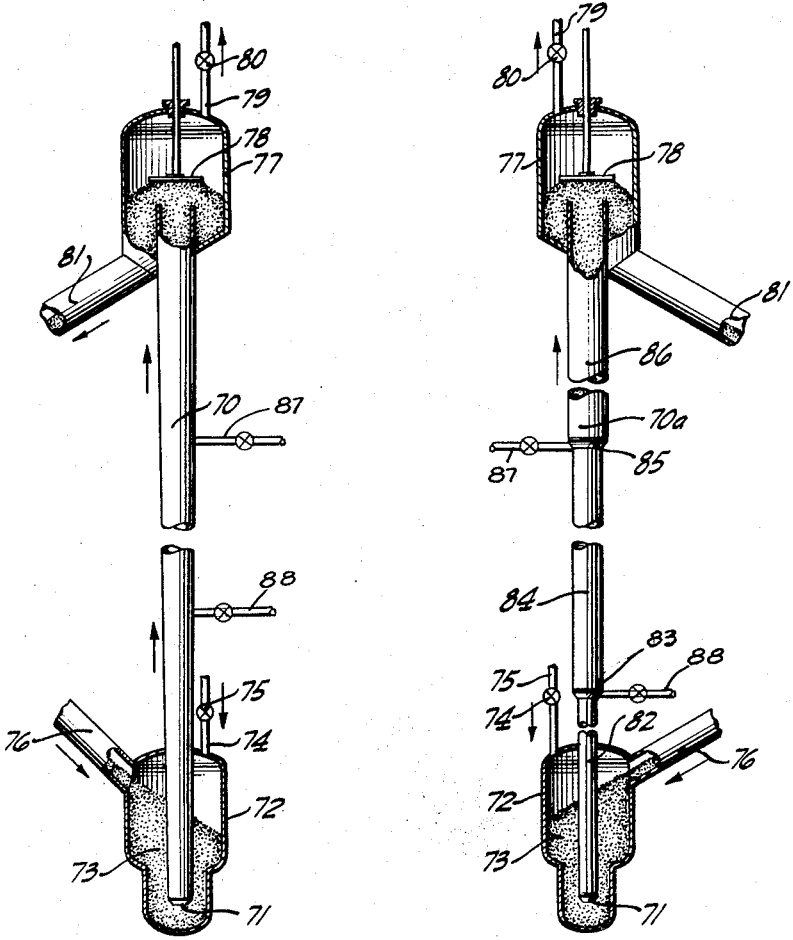

When an assumed pressure differential across the lift line is found and agreement between the calculated and known values of $L$ is obtained, the plot of $A_x$ versus $P_x$ made in final calculation establishes the correct relation between the required cross sectional area of the lift line at any point along the length thereof to establish the desired conditions of constant $$\sqrt{\frac{dp}{dl\rho} - gA^{1.5}}$$

and constant lift gas velocity to give the desired operating conditions from the lift line. In such lift lines, the area of the cross section increases in the direction of flow as shown in Figures 2 and 3.

The final relationship obtained in graphical form of $A_x$ versus $P_x$ is employed to determine the location of lift gas draw-off points along the lift line and from this the quantity of lift gas to be removed from any given point may be determined. Since the tapered line calculated from the equations is to be substituted with the cylindrical line in which the constancy of the solids flow criterion is maintained by removing portions of lift gas from the lift line, theoretically an infinite number of lift gas draw-off points are required. It has been found that desirably the value of the solids flow criterion in the line should not increase from the desired constant value by greater than about 25% and preferably less than about 10% depending upon the physical properties of the granular solids and the lift gas. After selection of an allowable velocity increase which may be tolerated in each part of the lift line between adjacent lift gas draw-off points, the points for lift gas removal and the percentage of lift gas flowing which is to be removed from each point may be determined. If an allowable increase of 10% is tolerated then the ratio of the criterion at the draw off to the criterion at the bottom of the lift line is equal to 1.1. Values of the criterion are calculated from the final $A_x$ versus $P_x$ relationship and sufficient lift gas is removed from each of the various draw-off points to reduce the criterion to that existing at the bottom of the lift line.

In many instances there are temperature changes in the lift gas as it passes through the lift line and corrections for lift gas velocity changes due to temperature effects may be made according to the well known gas laws.

The foregoing discussion for lift line design and the physical relationships governing its operation were based upon a viscous or streamline flow of lift gas. The above relationships do not hold true where the lift gas is depressuring in turbulent flow. The determination of whether turbulent flow or viscous flow conditions exist within the lift line may be made by calculation of a modified Reynolds number given by expression:

$$\text{Re. No.} = \frac{D_p V_0 \rho}{\mu} \quad (11)$$

in which $D_p$ is the nominal diameter of the particles in feet, $V_0$ is the gas velocity in feed per second based on the cross sectional area of the empty conduit, $\rho$ is the density of the fluid (lift gas) in pounds mass per cubic foot, and $\mu$ is the viscosity of the fluid (lift gas) in pounds mass per foot second. When the Reynolds number as calculated from this relationship is less than about 40 the lift gas is flowing in a viscous flow condition and when the Reynolds number is greater than 40 the lift gas is in turbulent flow.

When a preliminary analysis such as by a first trial and error calculation, it is indicated that a turbulent flow condition of lift gas exists. The fundamental relationships for the lift line expressed in Equation 1 for viscous flow do not apply and in turbulent flow the fundamental relationship is expressed by:

$$\left[\frac{1}{2}A_x^2\left(\frac{A_0}{A_x}\right)^3 + A_x^2\right]^{1/2} = \left[\frac{aQ}{\rho}\sqrt{\frac{c}{\rho g}}\right]\frac{P_0 - P_x}{\sqrt{RTP_x}} + A_0\sqrt{1.5\frac{P_0}{P_x}} \quad (12)$$

in which the factors having the same meaning as expressed above, the constant $R$ is the gas constant in consistent units, and where factor $c$ is derived from an expression of the Fanning equation for turbulent flow as follows:

$$c = \frac{1}{\rho V^2}\left(\frac{dp}{dl}\right) \quad (13)$$

The value of $c$ is determined by experimentation on the particular granular solids to be transferred.

The determination of the length, pressure drop, and cross sectional area of the lift line is determined in an analagous manner to that described above for viscous flow. The equation for turbulent flow which corresponds to Equation 8 in viscous flow is given below:

$$\frac{dp}{dl} = \rho g\left[1 + 0.5\left(\frac{A_0}{A_x}\right)^3\right] \quad (14)$$

The trial and error calculation of the lift line is then made using Equations 12 and 14, whereby the change in cross sectional area of the lift line with length and with pressure drop is given. From this date it may be determined as before, the points at which lift gas is drawn off from the conduit so as to maintain a constant value of $$\sqrt{\frac{dp}{dl\rho} - gA^{1.5}}$$

throughout the length of the line.

It has been found that in lift lines employing a turbulent flow of lift gas that the transport rate of granular solids preferably is held between about 55% and 90% of the free flow rate given by Equation 4, the optimum flow rate is equal to 71% of the flow rate which would result if a conduit of identical area were allowed to flow freely by gravity. The free flow rate under gravity is given by Equation 4, and the preferred flow rate for turbulent lift gas flow is given below:

$$Q = 0.0024\rho D_3 \pm 30\% \quad (15)$$

For a known volume of solids to be transported the required cross sectional area at the bottom of the lift line $A_0$ is given below:

$$A_0 = \frac{\pi}{4}\left[\frac{Q}{0.0024\rho}\right]^{2/3} \quad (16)$$

The units in these equations are consistent with those used in the previous equations.

Lift lines constructed according to the relationships discussed above are shown in the accompanying drawings, in which:

Figure 1 shows the application of a lift line according to this invention to the circulation of granular solids through one or two vessels and from which lift line a portion of the lift gas depressuring therethrough is removed at various points, Figure 2 shows a lift line consisting of a tapered conduit the cross sectional area of which increases in the direction of flow according to Equation 1 or 12 to maintain a constant value of $$\sqrt{\frac{dp}{dl}\Big|_\rho - gA^{1.5}}$$

throughout its length, and

Figure 3 shows a lift line in which a series of connected cylindrical sections comprise the lift line, the cross sectional area of which increases approximately according to Equations 1 or 12 depending upon the type of lift gas flow employed.

Referring now more particularly to Figure 1, a lift line having three stages 10, 11 and 12 is provided for the circulation of granular solids through vessels 13 and 14. The lift line is provided with induction zone 15 into which the lower stage 10 of the lift line extends and is provided with restriction 16 by means of which the granular solids are caused to pass from induction zone 15 into the lift line under the influence of a lift gas introduced under pressure via line 17 controlled by valve 18. As above described, the lift line according to this invention requires for smooth operation a substantially constant lift gas velocity or a constant value of $$\sqrt{\frac{dp}{dl}_\rho - gA^{1.5}}$$

throughout the length of the line. The lift gas upon passing through stage 10 of the lift line depressures concurrently with the upwardly moving granules and simultaneously increases in volume causing increase in the lineal lift gas velocity. At the upper end of stage 10, disengaging zone 19 is provided whereby a portion of the lift gas at that point is removed via line 20 controlled by valve 21 in order to reduce the lift gas velocity to substantially the value existing in the lower portion of stage 10 of the lift line. A funnel shaped member 22 is attached to stage 10 whereby an increased disengaging area 23 of granular solids is provided so that the removal of the required quantity of lift gas at this point does not cause the suspension of solid granules and the carry-over of these granules with the removed lift gas. Disengaging zone 19 is surrounded by a header 24 from which the separated lift gas is removed via line 20. Desirably, the thus removed lift gas is compressed by means not shown and is combined with the lift gas introduced into induction zone 15 by means of line 17.

The remaining quantity of lift gas passes upwardly to depressure a further amount through stage 11 of the lift line which has the same diameter and cross sectional area as stage 10. The upper end of stage 11 is provided with disengaging zone 25 which in turn contains a thrust plate 26, analogous to thrust plate 22a in disengaging zone 19, against which the discharging solids are pressed thereby maintaining the granular solids present in the lift line below in substantially compact form. Disengaging area 27 is formed through which the required quantity of lift gas may be separated from the granular solids without the suspension of individual particles, that is, the area is great enough so that the gas velocity through that area is substantially less than the lifting velocity of the smaller particles. A portion of the lift gas is removed from this disengaging zone via line 28 controlled by valve 29. The remaining quantity of lift gas depressures upwardly through stage 12 and is introduced directly into separator zone 30 provided with thrust plate 31 which may be of variable position as regards discharge opening 32 of the lift line. Another lift gas disengaging area 33 is formed in separator 30 whereby at least a substantial portion of the remaining quantity of lift gas is disengaged from the solids in separator zone 30 and removed therefrom via line 34 controlled by valve 35. If desired, a sufficient back pressure may be obtained in separator 30 by regulation, either manual or automatic, of valve 35 so that a small portion of the lift gas passes downwardly through transfer lines 36 and 37 into the upper portion of vessels 13 and 14 where they will act under these conditions as a seal gas to isolate the upper portion of the lift line from the vessels to which the solids are to be delivered. The seal gas may then be removed via lines 38 and 39 controlled by valves 40 and 41, respectively, from the upper portions of vessels 13 and 14.

Vessels 13 and 14 are vessels in which continuous contact of granular solids with gaseous or vaporous fluids is effected such as the contact involved in continuous catalytic cracking or in continuous adsorption such as in the separation of gaseous mixtures on a solid granular adsorbent. One vessel may be a reactor while the other may be a regenerator for the regeneration of spent adsorbents or catalysts. Actually it is immaterial to the methods of the present invention what processes are being carried out in the vessels and the methods of the present invention are applicable to the circulation of any granular solids through one or more treating vessels.

In the case of a continuous catalytic cracking operation vessel 14 may be a reactor into which a regenerated granular catalyst is introduced via line 37. Lines 42 and 43 controlled, respectively, by valves 44 and 45 serve interchangeably as inlets and outlets for the oil to be cracked. The products are removed and the spent catalyst passes downwardly to the bottom of the vessel wherefrom a seal gas is removed via line 46 controlled by valve 47 which may be a portion of the lift gas passing upwardly through transfer line 48 and sealed solids feeder 49. Granular catalyst passes downwardly through transfer line 48, through sealed solids feeder 49 and into induction zone 15 where solids accumulation 50 forms. The sealed feeder 49 is required to introduce the solids from the pressure of the vessel into a higher pressure zone existing in induction vessel 15. The pressure differential existing across zone 49 is approximately equal to the differential pressure existing across the lift line. The spent granular solids are conveyed upwardly through the lift line to separator zone 30 from which a portion may be recycled through reactor vessel 14 via transfer line 37 controlled by valve 51 and a portion may be passed via transfer line 36 controlled by valve 52 to vessel 13 which may comprise a regeneration vessel. Conduits 53 and 54 controlled, respectively, by valves 55 and 56 serve interchangeably as the inlet and outlet for the regeneration fluid depending upon whether concurrent or countercurrent contact is desired. It is immaterial to the present invention whether or not a multiplicity of regeneration gas inlets and outlets are employed.

Regenerated granular solids collect in the bottom of vessel 13 from which a seal gas is removed via line 57 controlled by valve 58 and which may also comprise a portion of the lift gas passing upwardly from induction zone 15 through sealed solids feeder 59 and transfer line 60 into the bottom of vessel 13. By the system of seals described above, the gaseous fluids involved in vessels 13 and 14 are not only isolated from each other but are also isolated from the lift line. If desired, a lift gas may be employed which will serve as a stripping gas in the lower portions of either or both vessels to recover materials which are desirably removed from the catalyst or other granular solids prior to being introduced into the other vessel.

A third inlet or outlet has been shown in vessels 13 and 14 in the form of lines 61 and 62 controlled, respectively, by valves 63 and 64 which may serve as an inlet or outlet for other fluids and particularly serves as a feed gas inlet when one or both of the vessels operate as a continuous adsorption column in which the lighter fraction of the feed gas is removed above and the heavier fraction of the feed gas is removed below inlet lines 61 and 62 from the respective vessels.

Although the system described in connection with Figure 1 shows two vessels but with one lift line and is of advantage when a portion of the materials removed from one vessel are desirably recirculated to the same vessel, two such lift lines as that described and illustrated may be employed in which no such recirculation of materials is desired or are necessary. In such a case two induction zones, two entire multistage lift lines and two separator zones would be provided substantially identical to those described in the drawing. In such an instance each lift line would be employed to convey the solids removed from the bottom of one vessel to the top of the other vessel. It should not be understood that this process is limited to two vessels and one lift line or to two vessels and two lift lines because one advantage of the conveyance method of this invention is its extreme flexibility with regard to complex systems involving solids conveyance.

It is further not to be implied from the present description that the lift line according to this invention is to be limited to two disengaging zones and three lift line stages, for depending upon the relative magnitude of the pressure drop with respect to the absolute operating pressure as well as the allowable velocity increase in the line, one or two or three or more individual stages of the lift line may be employed to maintain any desired degree of constancy of the lift gas velocity or the value of the solids flow criterion $$\sqrt{\frac{dp}{dl\rho} - gA^{1.5}}$$

throughout the entire length of the lift line. Preferably from each such disengaging zone or lift gas draw-off point the portion of lift gas thus removed is compressed individually and returned to the bottom of the lift line with additional quantities of lift gas.

Referring now more particularly to Figure 2, a lift line 70 is shown which has a tapered form such that the cross sectional area open to solids flow increases in the upward direction. This lift line is provided with restriction 71 at its lower extremity within induction zone 72 and submerged below solids accumulation 73 whereby under the influence of lift gas introduced through line 74 controlled by valve 75 into induction zone 72 the granular solids are introduced into the inlet opening of lift line 70. Transfer line 76 is provided for the continuous introduction of granular solids under pressure into induction zone 72. The lift gas depressures upwardly and because of the fact that the cross sectional area of the conduit increases along the path of flow, it compensates for the depressuring of the lift gas in the lift line the value of $$\sqrt{\frac{dp}{dl\rho} - gA^{1.5}}$$

remains constant throughout the length of the line. The granular solids discharge into separator zone 77 against thrust plate 78, and the lift gas is removed via line 79 controlled by valve 80. The solids discharge from separator 77 by transfer line 81 to the point to which they are to be delivered. The relationship between the cross sectional area and the lift gas pressure at any point along the length of lift line 70 is described in Equation 1 where viscous lift gas flow exists and by Equation 12 when the lift gas flows in turbulence. By fabricating lift line 70 in strict accordance with the cross sectional area required from the aforementioned equations an absolutely constant exertion of lifting energy on each granular particle regardless of position in the lift line may be obtained.

The foregoing discussion with regard to Figure 2 applies to Figure 3 and the components therein which are also present in Figure 2 are numbered similarly. In Figure 3, a variation is made in the type of lift line conduit 70a wherein an approximation is made in the required cross sectional area of the lift line according to the aforementioned equations. Lift line 70a is shown in three cylindrical sections of progressively increasing cross sectional area in a direction of flow whereby an approximation to the required cross sectional area of the lift line is made. Lower section 82 is connected by means of interchanging section 83 to section 84 which in turn is connected by means of interchanging connection 85 with upper section 86, the entire series of sections going to make up the lift line conduit 70a. Such an approximation to the required change in cross sectional area is of value since the cost of such a conduit, particularly in the mass of sizes required in some installations, is considerably less than the cost of a tapered conduit which conforms exactly to Equations 1 and 12.

If desired, portions of lift gas may be removed from lift lines 70 or 70a via lines 87 and 88 to assist in compensating for the lift gas depressuring.

It is to be understood that the lift lines described and illustrated in Figures 2 and 3 may be applied to any of the conveyance operations described in connection with Figure 1. The success which has resulted from conveying solids according to the present methods is due to providing a lift line in which compensation is made by one of the three means described for the solids flow criterion increase which normally accompanies the depressuring of the lift gas through an upwardly moving column of solids. By compensating for such variations and maintaining a lift line or the method of operating a lift line in accordance with the Equations 1 and 12, a uniform lifting effect on each particle regardless of its position in the lift line results and smooth efficient trouble-free operation results. The quantity of fine materials formed by abrasion and other attrition processes is materially reduced because of the relatively low velocity of the particles, their inability to impact with each other on the walls of the conveying apparatus, and the attritionless steps of introducing and removing the solids from the lift line all contribute to the marked reduction in losses due to fines formation.

It is to be understood that the methods and apparatus of the present invention are not limited to the conveyance of any particular type of granular solids, but are applicable to granular solids having low or high bulk density, to masses of granular solids containing uniformly large particles or uniformly small particles or to masses of granular solids containing fines as well as larger particles and an efficient attritionless mode of conveyance is provided.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:
1. A method for the conveyance of granular solids which comprises passing a compact mass of granular solids through a conveyance zone by flowing a conveyance fluid concurrently with said solids through said conveyance zone at a rate sufficient to convey said solids, restricting the discharge of said solids from said conveyance zone by applying a thrust force thereto to maintain the solids during conveyance at a bulk density substantially equal to the bulk density of said solids at rest, and maintaining the conveying force of said depressuring conveyance fluid on the individual particles of said granular solids substantially constant throughout said conveyance zone by removing at least one portion of said conveyance fluid therefrom at a point along the length thereof.

2. A process according to claim 1 wherein said conveyance fluid is passing through said conveyance zone in viscous flow in combination with the step of controlling the flow rate Q of granular solids through said conveyance zone at an optimum value determined by $$Q = 0.00196 \rho D^3 \pm 20\%$$

wherein Q is pounds of granular solids per second, $\rho$ is the bulk density of the granular solids when compact in pounds per cubic foot, and D is the diameter of the conveyance zone in inches.

3. A process according to claim 1 wherein said conveyance fluid is passing through said conveyance zone in turbulent flow in combination with the step of controlling the flow rate Q of granular solids through said conveyance zone at an optimum value given by:

$$Q = 0.0024 \rho D^3 \pm 30\%$$

wherein Q is pounds of granular solids per second, $\rho$ is the bulk density of the granular solids when compact in pounds per cubic foot, and D is the diameter of the conveyance zone in inches.

4. A method according to claim 1 in combination with the step of maintaining at said point along the length of said conveyance zone a fluid disengaging area of granular solids which is sufficiently great so that the fluid velocity through said area of the removed conveyance fluid portion is substantially less than the lifting velocity of the smaller solid particles whereby the conveyance fluid removal does not cause the suspension of solid granules and carry-over of said granules with the removed conveyance fluid.

5. A method for the conveyance of granular solids which comprises passing a compact mass of granular solids through a conveyance zone by passing a concurrent flow of a conveyance fluid therethrough at a rate sufficient to convey said solids, applying a solids flow restrictive force against solids discharging from said conveyance zone thereby maintaining the solids in said conveyance zone at a bulk density substantially equal to the bulk density of said solids at rest, and maintaining the conveyance fluid velocity substantially constant throughout the length of said conveyance zone by removing at least one portion of said conveyance fluid therefrom at a point along the length thereof.

6. A method for the conveyance of granular solids which comprises depressuring a conveyance fluid through a conveyance zone at a rate sufficient to convey a compact mass of granular solids therethrough, applying a thrust force to the solids discharging therefrom to maintain the solids during conveyance at a bulk density substantially equal to the bulk density of said solids at rest, and maintaining a substantially constant value of pressure drop per unit length $$\frac{dp}{dl}$$

throughout the length of said conveyance zone by removing at least one portion of said conveyance fluid at a point along the length thereof.

7. A method for the conveyance of granular solids which comprises establishing an induction zone communicating through a conveyance zone with a separator zone, introducing and maintaining an accumulation of compact solids to be conveyed in said induction zone to submerge the inlet opening of said conveyance zone, passing a compact mass of granular solids from said induction zone to said separator zone by passing a concurrent flow of conveyance fluid from said induction zone through said conveyance zone into said separator zone at a rate sufficient to convey said solids, applying a solids flow restricting thrust force to solids discharging from the outlet opening of said conveyance zone to maintain said solids in substantially compact form therein at a bulk density substantially equal to the bulk density of said solids at rest, and maintaining a substantially constant value of $$\sqrt{\frac{dp}{dl\rho} - gA^{1.5}}$$

(wherein $$\frac{dp}{dl}$$

is the pressure drop per unit length, $\rho$ is the bulk density of the granular solids, A is the cross-sectional area of the conveyance zone and $g$ is the acceleration of gravity, all units being consistent) throughout said conveyance zone by removing a controlled portion of said conveyance fluid therefrom along the length thereof.

8. A method for conveyance of granular solids which comprises introducing granular solids to be conveyed into an induction zone to form and maintain a compact solids accumulation therein submerging the inlet opening of a conveyance zone opening thereinto, introducing a conveyance fluid into said induction zone under pressure whereby said fluid flows therefrom through said conveyance zone at a rate sufficient to convey said solids concurrently therewith into a separator zone, applying a force against the solids discharging from the outlet opening of said conveyance zone to maintain said solids therein during conveyance at a bulk density substantially equal to the static bulk density of said solids when at rest, removing conveyed solids at a controlled rate from said separator zone, removing said conveyance fluid therefrom, and maintaining a substantially constant conveyance force and conveyance fluid velocity within said conveyance zone by the step of withdrawing a controlled portion of said conveyance fluid from said conveyance zone at at least one point along the length thereof to at least partially compensate for conveyance fluid velocity increases resulting from depressuring of said conveyance fluid therein.

9. A process according to claim 8 in combination with the steps of repressuring said portion of conveyance fluid withdrawn from a point along the length of said conveyance zone, and recirculating the thus repressured fluid to said induction zone.

10. A process according to claim 8 in combination with the step of controlling the amount of the withdrawn portion of conveyance fluid to limit the maximum conveyance fluid velocity in said conveyance zone to a value less than about 25% greater than the minimum conveyance fluid velocity existing therein.

11. A process according to claim 8 in combination with the step of controlling the amount of the withdrawn portion of conveyance fluid to limit the maximum conveyance fluid velocity in said conveyance zone to a value less than about 10% greater than the minimum conveyance fluid velocity existing therein.

12. A process according to claim 8 wherein said conveyance fluid flows through said conveyance zone in viscous flow in combination with the step of controlling the solids flow rate therethrough at a rate of Q pounds per second given by:

$$Q = 0.00196 \rho D^3 \pm 20\%$$

wherein $\rho$ is the bulk density of said solids in pounds per cubic foot, and D is the inside diameter of said conveyance zone in inches.

13. A process according to claim 8 wherein said conveyance fluid flows through said conveyance zone in turbulent flow in combination with the step of controlling the solids flow rate therethrough at a rate of Q pounds per second given by:

$$Q = 0.0024 \rho D^3 \pm 30\%$$

wherein $\rho$ is the bulk density of said solids in pounds per cubic foot, and D is the inside diameter of said conveyance zone in inches.

14. A method for the conveyance of granular solids which comprises establishing an induction zone, a separator zone and a conveyance zone, communicating therebetween, passing granular solids into said induction zone to form and maintain an accumulation of said solids therein which submerges the inlet of said conveyance zone, introducing a conveyance fluid into said induction zone under an elevated pressure relative to that maintained in said separator zone thereby flowing said conveyance fluid through said conveyance zone to convey said solids concurrently therethrough, maintaining said solids during conveyance substantially at their at-rest bulk density by applying a force against said solids discharging from said conveyance zone into said separator zone, removing successive portions of said conveyance fluid at a plurality of points along said conveyance conduit to maintain therein a substantially uniform conveying force, and removing the remaining portion of said conveyance fluid and said solids from said separator zone.

15. A method according to claim 14 wherein said conveyance zone is provided with an increasing cross-sectional area in the direction of solids flow to at least partly compensate for the increase in volume per unit weight of said conveyance fluid during passage through said conveyance zone.

16. A method according to claim 14 wherein the substantially uniform conveyance force is established by maintaining within said conveyance zone a substantially constant lineal conveyance fluid velocity.

17. A process for conveying granular solids which comprises passing a conveyance fluid in viscous flow through a conveyance zone at a rate sufficient to convey a substantially compact mass of granular solids therethrough, applying a thrust force to the solids discharging from said conveyance zone thereby maintaining said solids during conveyance at a bulk density substantially equal to the bulk density of said solids when at rest, controlling the flow rate of granular solids through said conveyance zone to between about 45% and 70% of the free gravity flow rate Q from a conveyance zone of the same diameter given by:

$$Q = 0.0034 \rho D^3$$

(wherein Q is pounds of granular solids per second, $\rho$ is the bulk density of the granular solids when compact in pounds per cubic foot, D is the diameter of the conveyance zone in inches), and removing part of said conveyance fluid from along the length of said conveyance zone to maintain the conveyance force generated by the conveyance fluid flow therethrough substantially constant throughout said conveyance zone.

18. A process for conveying granular solids which comprises passing a conveyance fluid in turbulent flow through a conveyance zone at a rate sufficient to convey a substantially compact mass of granular solids therethrough, applying a thrust force to the solids discharging from said conveyance zone thereby maintaining said solids during conveyance at a bulk density substantially equal to the bulk density of said solids when at rest, controlling the flow rate of granular solids through said conveyance zone to between about 55% and 90% of the free gravity flow rate Q from a conveyance zone of the same diameter given by:

$$Q = 0.0034 \rho D^3$$

(wherein Q is pounds of granular solids per second, $\rho$ is the bulk density of the granular solids when compact in pounds per cubic foot, D is the diameter of the conveyance zone in inches), and removing part of said conveyance fluid from along the length of said conveyance zone to maintain the conveyance force generated by the conveyance fluid flow therethrough substantially constant throughout said conveyance zone.

19. A process for the conveyance of granular solids which comprises establishing a conveyance zone provided with a plurality of serially communicating conveyance zone stages, passing granular solids into said conveyance zone in compact form, passing a conveyance fluid successively through said stages at a rate sufficient to convey said granular solids therethrough, applying a thrust force to the solids discharging from the outlet of said conveyance zone to maintain said solids during conveyance at a bulk density substantially equal to the bulk density of said solids when at rest, and removing a controlled portion of said conveyance fluid from said conveyance zone, between said stages to maintain a substantially constant value of $$\sqrt{\frac{dp}{dl\rho} - gA^{1.5}}$$

(wherein $$\frac{dp}{dl}$$

is the pressure drop per unit length, $\rho$ is the bulk density of the granular solids, A is the cross-sectional area of the conveyance zone, and g is the acceleration of gravity, all units being consistent) throughout said conveyance zone.

20. A process for contacting granular solids with gaseous fluids which comprises establishing a conveyance zone communicating an induction zone with a separator zone, establishing a contact zone communicating with said separator zone, introducing granular solids into said induction zone, introducing a conveyance fluid into said induction zone to establish a high pressure therein relative to the pressure maintained in said separator zone thereby flowing said conveyance fluid concurrently with a compact mass of said granular solids through said conveyance zone into said separator zone, applying a force against said solids discharging from the outlet of said conveyance zone to maintain said mass of solids therein during conveyance at a bulk density substantially equal to the static bulk density of said solids when at rest, removing at least a portion of said conveyance fluid from at least one point along the length of said conveyance zone thereby maintaining a substantially uniform value of $$\sqrt{\frac{dp}{dl\rho} - gA^{1.5}}$$

(wherein $$\frac{dp}{dl}$$

is the pressure drop per unit length, $\rho$ is the bulk density of the granular solids, A is the cross-sectional area of the conveyance zone, and g is the acceleration of gravity, all units being consistent) through said conveyance zone, removing at least a portion of depressured conveyance fluid from said separator zone, passing said granular solids from separator zone to said contacting zone, introducing a gaseous fluid to be contacted into said contacting zone, and removing the gaseous products of said contact therefrom.

21. A process according to claim 20 wherein said conveyance zone is provided with a cross-sectional area which varies in accordance with the lift gas pressure at a given point within said conveyance zone by the following equation:

$$\frac{A_x}{3}\left(\frac{A_x}{A_0}\right)^3 + A_x = \frac{aQ}{bg\rho 2}\left(\frac{P_0 - P_x}{P_x}\right) + 1.33 A_0 \left(\frac{P_0}{P_x}\right)$$

wherein said lift gas flows in viscous flow, wherein $A_0$ and $A_x$ are the cross-sectional areas of said conveyance zone at the point of entry and any point $x$ distance therefrom respectively, $P_0$ and $P_x$ are the lift gas pressures at the point of entry and any point $x$ distance therefrom respectively, Q is the flow rate of granular solids, $\rho$ is the bulk density of the granular solids, g is the gravitational constant, $a$ is a fraction of voids in the granular solids, and $$b = \frac{V}{A\frac{dp}{dl}}$$

where V is the gas volume, A is the cross-sectional area, and $$\frac{dp}{dl}$$

is the differential pressure per unit length, all units being consistent.

22. A process according to claim 20 wherein said conveyance zone is provided with a cross-sectional area which varies in accordance with the lift gas pressure as in the following equation:

$$\left[\frac{1}{2}A_x^2\left(\frac{A_0}{A_x}\right)^3 + A_x^2\right]^{1/2} = \left[\frac{aQ}{\rho}\sqrt{\frac{c}{\rho g}}\frac{P_0 - P_x}{\sqrt{RTP_x}} + A_0\sqrt{1.5\frac{P_0}{P_x}}\right]$$

wherein the lift gas is in turbulent flow, wherein $A_0$ and $A_x$ are the cross-sectional areas of said conveyance zone at the point of entry and any point $x$ distance therefrom respectively in said conveyance zone, $P_0$ and $P_x$ are the lift gas pressures at the point of entry and any point $x$ distance therefrom respectively in said conveyance zone, $a$ is a fraction of voids in the granular solids, Q is the flow rate of granular solids, $\rho$ is the bulk density of the granular solids, g is the gravitational constant, R is the gas constant, T is the temperature, and $$c = \frac{1}{\rho V^2}\frac{dp}{dl}$$

wherein V is the gas volume and $$\frac{dp}{dl}$$

is the differential pressure per unit length.

23. An apparatus for conveying granular solids which comprises an elongated conveyance conduit, means for maintaining an accumulation of said solids submerging the inlet of said conveyance conduit, means for passing a conveyance fluid through said conveyance conduit so as to convey said solids concurrently with said conveyance fluid from said inlet to the outlet of said conveyance conduit, means for applying a solids compacting force at said outlet so as to maintain the solids at substantially their static bulk density at said outlet and throughout said conveyance conduit, means for removing said solids and said conveyance fluid from said outlet, and at least one conduit for fluid flow communicating with said conveyance conduit along the length thereof.

24. An apparatus for conveying granular solids through a conveyance zone which comprises means for maintaining an accumulation of said solids submerging the inlet of a conveyance conduit, means for passing a conveyance fluid through said conveyance conduit so as to convey said solids concurrently with said conveyance fluid from said inlet to the outlet of said conveyance conduit, means for applying a solids compacting force at said outlet so as to maintain the solids at substantially their static bulk density at said outlet and throughout said conveyance conduit, means for removing said solids and said conveyance fluid from said outlet, and fluid-solids disengaging means for removing at least one stream of conveyance fluid along the length of said conveyance conduit.

25. An apparatus according to claim 1 wherein said disengaging means along the length of said conveyance conduit is adapted to the disengagement of said conveyance fluid from said solids through disengaging area of granular solids of sufficiently great extent so that the removal of conveyance fluid through said area does not cause the suspension of solid granules and the carry-over of said granules with the removed conveyance fluid.

26. Apparatus for the conveyance of granular solids which comprises an induction chamber, an inlet conduit thereto for granular solids, inlet conduit thereto for a conveyance fluid under pressure, a conveyance conduit opening into the lower part of said induction chamber at one end and at the other end opening into a separator chamber, an outlet conduit therefrom for conveyed granular solids, an outlet conduit therefrom for prepressured conveyance fluid, means within said separator disposed adjacent the outlet opening of said conveyance conduit and adapted to apply a thrust force to granular solids discharging from said opening and thereby maintain the solids during conveyance in substantially compact form and at a bulk density substantially equal to the bulk density of said solids at rest, and outlet means associated with said conveyance conduit at points along the length thereof for removing successive portions of said conveyance fluid therefrom to maintain a substantially constant conveyance force throughout the length of said conveyance conduit.

27. An apparatus for the conveyance of granular solids which comprises an induction chamber, means for introducing solids and means for introducing a conveyance fluid opening thereinto, an elongated conveyance conduit having an inlet opening adjacent the bottom of said induction chamber, a separator chamber surrounding the outlet opening of said conveyance conduit, means within said separator chamber adjacent said outlet opening for applying a thrust force against the solids discharging therefrom thereby restricting granular solids flow from said outlet opening to maintain said solids throughout said conveyance conduit at a bulk density substantially equal to the bulk density of said solids at rest, means for maintaining said induction chamber under an elevated pressure relative to that in said separator chamber, means for disengaging a controlled portion of said conveyance fluid from said granular solids at at least one point along the length of said conveyance conduit, means for removing conveyance fluid from said separator chamber, and means for removing the conveyed granular solids at a controlled rate from said separator chamber.

28. An apparatus according to claim 27 wherein said elongated conveyance conduit is tapered having an increasing cross-sectional area with distance from said inlet opening.

29. An apparatus according to claim 27 wherein said elongated conduit comprises a plurality of serially connected conduit sections, each successive section in the direction of solids flow having a greater cross-sectional area than the preceding section.

30. An apparatus according to claim 29 wherein said conduit sections are cylindrical.

31. An apparatus according to claim 27 wherein said means for applying a thrust force comprises a transverse thrust plate disposed adjacent and spaced apart from said outlet opening of said conveyance conduit and against which the solids discharging therefrom are pressed.

32. An apparatus according to claim 27 in combination with means for repressuring conveyance fluid removed along the length of said conveyance conduit, and means for returning the repressured fluid to said induction chamber.

33. An apparatus for the conveyance of granular solids which comprises an induction chamber, an inlet line for introducing granular solids into said induction chamber, an inlet line for introducing lift gas under pressure into said induction chamber, a separator chamber, an outlet line for removing lift gas therefrom, a conveyance conduit having an inlet opening within said induction chamber adjacent the bottom thereof and an outlet opening within said separator, means adjacent said outlet opening for applying a thrust force against the flow of granular solids issuing therefrom into said separator from said conduit to maintain said solids during conveyance at a bulk density substantially equal to their static bulk density when at rest, the cross-sectional area of said conduit increasing with distance from said inlet opening toward said outlet opening according to the equation:

$$\frac{A_x}{3}\left(\frac{A_x}{A_0}\right)^3 + A_x^2 = \frac{aQ}{bg\rho^2}\left(\frac{P_0 - P_x}{P_x}\right) + 1.33 A_0 \frac{P_0}{P_x}$$

when the conveyance fluid flows in viscous flow and according to the equation:

$$\left[\frac{1}{2}A_x^2\left(\frac{A_0}{A_x}\right)^3 + A_x^2\right]^{1/2} = \left[\frac{aQ}{\rho}\sqrt{\frac{c}{\rho g \sqrt{RTP_x}}}\frac{P_0 - P_x}{P_x} + A_0\sqrt{1.5\frac{P_0}{P_x}}\right]$$

when the conveyance fluid flows in turbulent flow, wherein $A_0$ and $A_x$ are cross-sectional areas of said conduit at the bottom and at any point $x$ therefrom respectively, $P_0$ and $P_x$ are the lift gas pressures at the point of entry and at any point $x$ therefrom respectively, $R$ is the gas constant, $T$ is the temperature, $a$ is the fraction of voids in the granular mass, $Q$ is the flow rate of granular solids, $\rho$ is the bulk density of the granular solids, $g$ is the gravitational constant, wherein $b$ and $c$ are experimentally determined from:

$$b = \frac{V}{A\frac{dp}{dl}}$$

$$c = \frac{1}{\rho V^2}\frac{dp}{dl}$$

in which $V$ is the volume of gas, $A$ is the cross-sectional area open to gas flow, and $$\frac{dp}{dl}$$

is the differential pressure per differential length of the mass of granular solids, and means disposed along the length of said conveyance conduit for removing successive portions of said conveyance fluid therefrom whereby the conveyance force generated by the flow of said conveyance fluid remains substantially constant throughout the length of said conduit.

34. An apparatus for the conveyance of granular solids at a rate of Q pounds per second which comprises an induction chamber provided with a separate solids inlet and conveyance fluid inlet, a separator provided with a conveyance fluid outlet and a granular solids outlet, a conveyance conduit having at its lower extremity an inlet opening within said induction chamber at a point adjacent the bottom thereof and at its upper extremity an outlet opening within said separator, means adjacent said outlet opening within said separator for applying a thrust force to the solids discharging from said conveyance conduit to maintain said solids during conveyance at a bulk density substantially equal to the bulk density of said solids when at rest, means for removing successive portions of said conveyance fluid from said conveyance conduit at a plurality of points along the length thereof to maintain a controlled velocity of conveyance fluid flowing concurrently with granular solids flow through said conduit whereby a substantially constant conveyance force is maintained throughout the length of said conduit, said conduit being provided with a minimum cross-sectional area $A_0$ in square feet given by:

$$A_0 = \frac{\pi}{4}\left[\frac{Q}{0.00196\rho}\right]^{2/3}$$

when the conveyance fluid is flowing in viscous flow, and a minimum cross-sectional area $A_0$ in square feet given by:

$$A_0 = \frac{\pi}{4}\left[\frac{Q}{0.0024\rho}\right]^{2/3}$$

when the conveyance fluid flows in turbulent flow, wherein $\rho$ is the bulk density of said granular solids in pounds per cubic foot.

(References on following page)

References Cited in the file of this patent

UNITED STATES PATENTS

| Number | Name | Date |
|---|---|---|
| 727,030 | Tilghman | May 5, 1903 |
| 1,051,905 | McCord | Feb. 4, 1913 |
| 1,330,838 | Briston | Feb. 17, 1920 |
| 1,550,992 | Trump | Aug. 25, 1925 |
| 1,893,505 | Nungesser | Jan. 10, 1933 |
| 1,912,910 | Neuman | June 6, 1933 |
| 2,374,660 | Belchetz | May 1, 1945 |
| 2,488,029 | Scheineman | Nov. 15, 1949 |
| 2,509,983 | Morrow | May 30, 1950 |
| 2,541,077 | Leffer | Feb. 13, 1951 |

FOREIGN PATENTS

| Number | Country | Date |
|---|---|---|
| 180,397 | Great Britain | May 11, 1922 |
| 578,373 | Germany | June 13, 1933 |